(12) United States Patent
Tout et al.

(10) Patent No.: US 7,467,510 B2
(45) Date of Patent: Dec. 23, 2008

(54) CHAIN LINK ANTI-KNUCKLE INSERT

(75) Inventors: John Tout, Worchester (GB); Gordon Edmund Powell, Worchestershire (GB)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 11/939,879

(22) Filed: Nov. 14, 2007

(65) Prior Publication Data

US 2008/0120959 A1 May 29, 2008

Related U.S. Application Data

(60) Provisional application No. 60/866,065, filed on Nov. 15, 2006.

(51) Int. Cl.
*F16G 15/00* (2006.01)

(52) U.S. Cl. .................... 59/85; 59/86; 59/93

(58) Field of Classification Search ............. 59/78, 59/80, 84, 85, 86, 93
See application file for complete search history.

(56) References Cited

U.S. PATENT DOCUMENTS

| | | | |
|---|---|---|---|
| 168,081 A * | 9/1875 | Chamberlin | 59/84 |
| 785,881 A * | 3/1905 | Hill | 59/85 |
| 3,822,549 A * | 7/1974 | Rieger et al. | 59/85 |
| 4,161,100 A * | 7/1979 | Dalferth et al. | 59/93 |
| 4,510,032 A * | 4/1985 | Timmington | 204/196.2 |
| 5,375,407 A * | 12/1994 | Bogdan | 59/93 |
| 6,282,879 B1 * | 9/2001 | Bonaiti et al. | 59/86 |
| 6,679,648 B2 * | 1/2004 | Benecke | 403/408.1 |
| 6,684,619 B2 * | 2/2004 | Hara | 59/93 |

FOREIGN PATENT DOCUMENTS

| | | | |
|---|---|---|---|
| DE | 3246490 | * | 7/1984 |
| FR | 2436916 A1 | | 4/1982 |
| GB | 1366108 A | | 9/1974 |
| GB | 2356441 A | | 5/2001 |

* cited by examiner

*Primary Examiner*—David B Jones
(74) *Attorney, Agent, or Firm*—James Earl Lowe, Jr.

(57) ABSTRACT

An insert assembly adapted to be received within a link of a chain including a plurality of round wire interlocking links, the insert being made of a resilient material and being dimensioned to be wider than the central area height and longer than the central area depth so that after the insert is placed between the opposed sides of the chain, the insert springs back around the opposed sides of the chain so that the insert is securely locked between the opposed sides of the chain. The insert has a central opening, and the insert assembly further includes a pin secured in the opening when the insert is received in the chain central area so that the insert cannot move away from the chain opposed sides.

3 Claims, 3 Drawing Sheets

CHAIN LINK ANTI-KNUCKLE INSERT

BACKGROUND OF THE INVENTION

This invention relates to conveyor elements for the transport of bulk materials such as coal and the like, and, more particularly, to chain used in connection with longwall conveyor systems.

A longwall conveyor system includes a pan and a coal conveying chain and flight mechanism thereon. The coal conveying mechanism includes a sprocket drive that pulls the chain and flight mechanism along the pan. The flights are attached to the chain at spaced intervals. As the chain and flights move along the pan, coal is carried by the flights to the end of the pan, where it is transferred to a mechanism for taking the coal out of the underground mine.

SUMMARY OF THE INVENTION

The object of the invention is to provide an insert that can be introduced into an end link after the end link has already been connected to the structural part. This object is achieved according to the invention by a resilient insert, and an insert assembly including the insert and a pin received within the insert.

By virtue of the fact that, in the arrangement according to the invention, the insert can be inserted retrospectively into the clear interior of that end link of a chain strand that is already joined up to a structural part, the connection of the chain strand to the respective structural part is in many cases facilitated.

The invention thus comprises an insert assembly adapted to be received within a link of a chain including a plurality of round wire interlocking links, the insert being made of a resilient material and being dimensioned to be wider than the central area height and longer than the central area depth so that after the insert is placed between the opposed sides of the chain, the insert springs back around the opposed sides of the chain so that the insert is securely locked between the opposed sides of the chain. The insert has a central opening, and the insert assembly further includes a pin secured in the opening when the insert is received in the chain central area so that the insert cannot move away from the chain opposed sides.

Figure 1:
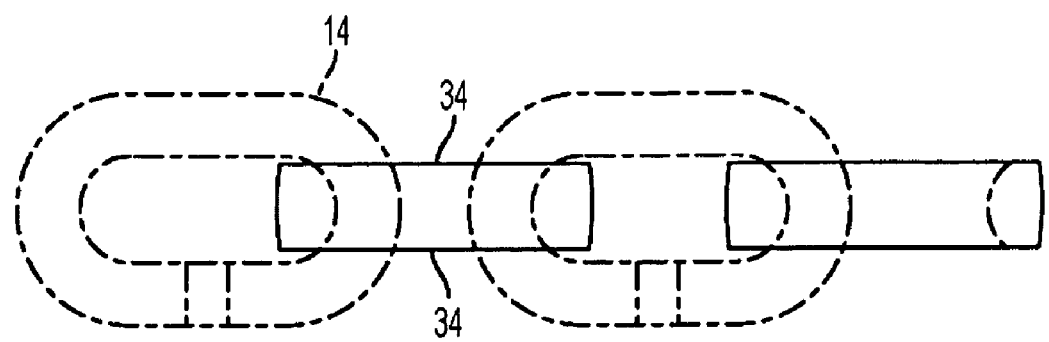
FIG. 1 is a top view of a few links of an endless conveyor chain.
Figure 2:
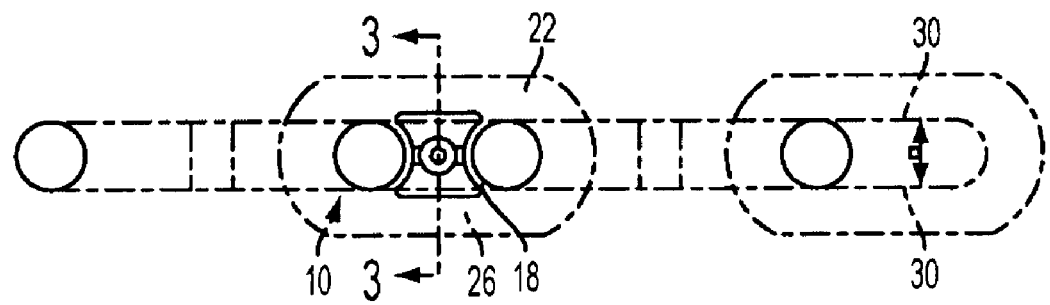
FIG. 2 is a side view of the chain shown in FIG. 1, with an insert assembly of this invention secured in one of the chain vertical links.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT OF THE INVENTION

As illustrated in the drawings, the invention is an insert assembly including an insert 10 and a pin 62 received within the insert 10.

The insert 10 is adapted to be received within a link of a chain including a plurality of round wire interlocking links 14, each link 14 having a central area 18 and opposed sides 22 and 26, the central area 18 having a height 30 and a depth 34 defined by the opposed sides.

The insert 10 is made of a resilient material and is dimensioned (see FIG. 4) to have a height 38 wider than the central area height and a length 42 longer than the central area depth so that after the insert is placed between the opposed sides of the chain, the insert springs back around the opposed sides of the chain so that the insert is securely locked between the opposed sides of the chain.

More particularly, the chain is a conveyor chain, and each of the links is oval and has parallel opposed sides 22 and 26. In the conveyor chain, the insert assembly is fitted on each vertical chain link located in front of each flight bar (not shown), preventing any link that may end up standing up vertically at 90° to the chain from then dropping in front of the flight bar. When this happens the vertical link cannot rotate itself back into the horizontal plane again as it locks against the flight bar body. This invention thus prevents this from happening.

If desired, the insert assembly can also be placed into all chain links.

The insert is a single piece or body design made of a polymer that deflects as it is inserted by force between the parallel legs of the vertical chain link. Once fully inserted, the insert springs back into place locking itself into position on the chain. More particularly, the insert is a thermoplastic with sufficient strength, durability and flexibility to engage the legs of the chain link and to flex back around the sides of the chain.

Figure 4:
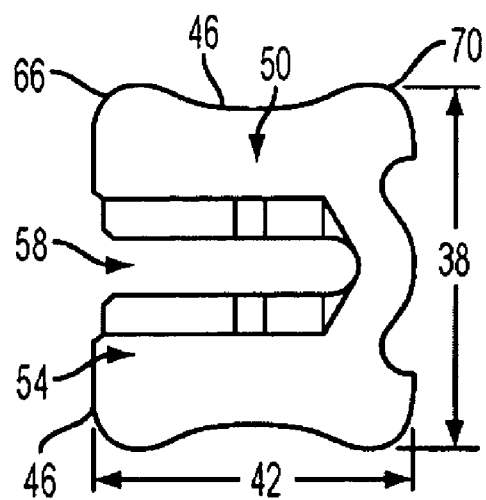
FIG. 4 is an enlarged side view of the insert shown in FIGS. 2 and 3.

As best shown in FIG. 4, the insert 10 has at least one indentation 46 with a curvature similar to the chain link side 22 or 24 so that the indentation 46 receives the rounded portion of its respective chain link side. In the preferred embodiment, the insert has a top 50 and a bottom 54, and there is an indentation in each of the top and the bottom.

More particularly, the insert has a central opening 58, and a pin 62 (see FIG. 3) secured in the opening 58 when the insert is received in the chain central area 18 so that the insert cannot move away from the chain opposed sides.

Further, the insert has a front 66 and a back 70, and the central opening 58 is in the form of a slot extending from the front 66 of the insert to about two-thirds of the way along the insert to the back 70 of the insert.

Still more particularly, the insert is C shaped, having an upper lip 50 and a lower chin 54, the back or rear wall 70 acting as a hinge that permits the lip 50 and chin 54 to be brought toward each other to reduce the height of the insert.

Figure 5:
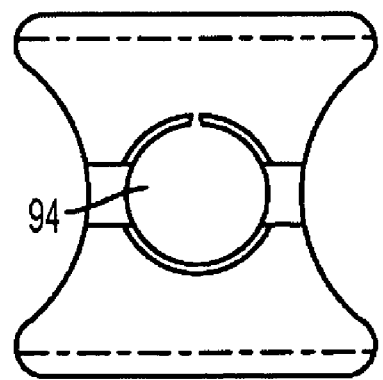
FIG. 5 is an end view of the insert shown in FIG. 5.
Figure 6:
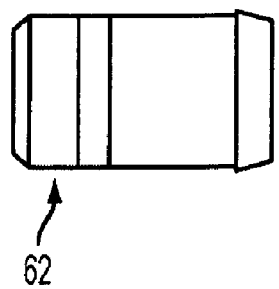
FIG. 6 is a side view of the pin shown in FIGS. 2 and 3.
Figure 7:
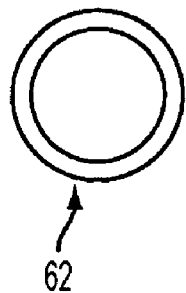
FIG. 7 is an end view of the pin shown in FIG. 6.
Figure 8:
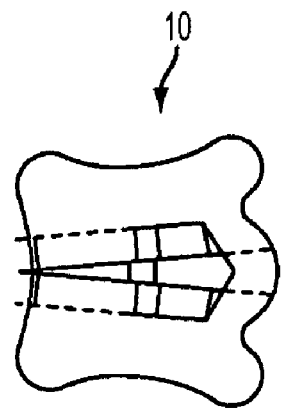
FIG. 8 is a side view of the insert in a flexed position where the front of the insert has a reduced height.

Still more particularly, the insert is formed by injection moulding, being made, as shown in FIGS. 4 and 5, in the form of a rectangular block having indentations on the top and bottom, a slot running horizontally from the front of the block to about two-thirds of the way along the block, with the base of the slot being cupped and having a radius, and spaced apart indentations in the rear of the block that result in a rear wall in the center two-thirds of the rear of the block of relatively constant thickness. As a result, the rear wall acts as a hinge and permits the lip and chin to be brought together, as shown in FIG. 8, to ease insertion of the insert into the chain link. A hole 74 extends through the rear wall 70, thus helping air to escape from the base of the slot when the pin is received in the insert.

The insert slot is slightly enlarged at its open end to aid in the insertion of the pin into the insert. And the lip is of a lesser height at the open end of the slot than at about two-thirds of the way along the slot, thus creating a taper that reduces the friction drag on the pin as it is being received in the insert.

The pin 62 in the insert 10 prevents from being able to collapse even under high loads that might otherwise force the insert assembly back out of the chain.

Figure 3:
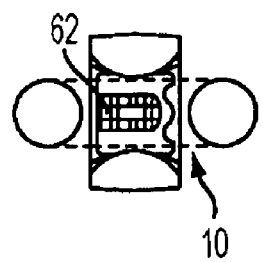
FIG. 3 is a cross section view of the insert and chain taken along the line 3-3 in FIG. 2.

The pin is a solid metal or plastic piece received in the insert slot, and when so received, as shown in FIG. 3, the pin prevents the lip and chin from being brought together. This prevents the insert from flexing around the adjacent sides of the chain link, thus retaining the insert inside the chain link.

Once inside the insert, the pin remains in the insert. In order to retain the pin in the insert, the height of the front end of the pin is larger than the height of the slot. Further, the front end of the pin is barbed by the front end having a relatively short dimension of lesser height at the front face of the pin and a larger dimension spaced away from the front face of the pin. At the larger dimension spaced away from the front face of the pin, the pin height drops sharply, thereby creating a barb that can engage the insert when the pin is fully located within the insert.

The rear end of the pin has a larger height than the slot and the central portion of the pin. This helps to retain the pin in the insert. The central portion of the pin has a height slightly less than the height of the slot to reduce the friction between the central portion of the pin and the insert. A short tapered area creates a transition between the central portion of the pin and the rear end of the pin.

To place the insert assembly inside a vertical chain link, the front of the insert is place against the legs of the chain link. The insert is then pushed into the link, the lip and chin coming together to slip between the link legs. Once in place, the lip and chin spring back into their original position, and are thereby locked around the legs of the chain link. In order to prevent the lip and chin from again coming together and the insert coming out of the chain link, the pin is driven, such as by a hammer, into the slot in the insert. Once so driven, the barbed front end engages the insert, and cannot be removed.

Various other features and advantages of the invention will be apparent from the following claims.

The invention claimed is:

1. An insert assembly adapted to be received within a link of a chain including a plurality of round wire interlocking links, each link having a central area and opposed sides, said central area having a height and a depth defined by said opposed sides, said insert assembly including an insert having a central area having a front and an opposed back, a top and an opposed bottom, the insert from top to bottom being dimensioned to be wider than the central area height and from front to back being longer than the central area depth so that after the insert is placed between the opposed sides of the chain, the insert is around the opposed sides of the chain so that the insert is securely locked between the opposed sides of the chain, said insert having a central opening extending from said front to said back, and said insert assembly including a pin secured in said opening when said insert is received in said chain central area so that said insert cannot move away from said chain opposed sides, wherein said central opening is a slot extending from the front of the insert to about two-thirds of the way along the insert to the back of the insert.

2. An insert assembly according to claim 1 wherein said insert is C shaped, the insert back acting as a hinge that permits said top and bottom adjacent said insert front to be brought toward each other to reduce the height of the insert.

3. An insert assembly according to claim 2 wherein the insert back has a hole extending there through.

* * * * *